United States Patent
Chu

(10) Patent No.: US 9,182,315 B2
(45) Date of Patent: Nov. 10, 2015

(54) LENS MODULE TESTING DEVICE

(71) Applicant: HON HAI PRECISION INDUSTRY CO., LTD., New Taipei (TW)

(72) Inventor: Chih-Hao Chu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 12 days.

(21) Appl. No.: 14/255,058

(22) Filed: Apr. 17, 2014

(65) Prior Publication Data

US 2014/0320851 A1    Oct. 30, 2014

(30) Foreign Application Priority Data

Apr. 26, 2013    (TW) ............................ 102115127 A

(51) Int. Cl.
| | | |
|---|---|---|
| G01M 11/00 | (2006.01) | |
| G01B 9/00 | (2006.01) | |
| G06K 9/00 | (2006.01) | |
| G06K 9/40 | (2006.01) | |
| G01M 11/02 | (2006.01) | |

(52) U.S. Cl.
CPC ...... G01M 11/0228 (2013.01); G01M 11/0214 (2013.01)

(58) Field of Classification Search
CPC ...................... G01M 11/0214; G01M 11/0228
USPC ............................ 356/125, 124; 382/103, 275
See application file for complete search history.

(56) References Cited

U.S. PATENT DOCUMENTS

| | | | |
|---|---|---|---|
| 7,609,372 B1* | 10/2009 | Tsai ............................... | 356/124 |
| 2002/0140928 A1* | 10/2002 | Akiyama et al. ............... | 356/124 |
| 2004/0021851 A1* | 2/2004 | Namiki .......................... | 356/125 |
| 2009/0141268 A1* | 6/2009 | Huang et al. ................... | 356/124 |
| 2011/0149273 A1* | 6/2011 | Yeh et al. ....................... | 356/125 |
| 2011/0188264 A1* | 8/2011 | Lin ................................ | 362/607 |

* cited by examiner

*Primary Examiner* — Tarifur Chowdhury
*Assistant Examiner* — Sunghee Y Gray
(74) *Attorney, Agent, or Firm* — Novak Druce Connolly Bove + Quigg LLP

(57) ABSTRACT

Lens module testing device for testing a lens module includes a testing platform, a light source, a testing board, a sensing element, a processor, a driving element, and a position feedback unit. The light source, the testing board, and the sensing element are arranged in order on the testing platform along an optical axis of the lens module. The lens module is positioned between the testing board and the sensing element. The light source emits testing light to the testing board, and the sensing element senses an image of the testing board and sends the image to the processor. The processor determines whether the testing board is in a focal plane of the lens module, controls the driving element to adjust a position of the testing board relative to the lens module, and obtains position information from the position feedback unit to generate a focal length of the lens module.

9 Claims, 2 Drawing Sheets

LENS MODULE TESTING DEVICE

FIELD

The present invention relates to testing devices, and particularly to a testing device for testing a lens module.

BACKGROUND

When assembled, lens modules need to be tested to determine whether a focal length of the lens module corresponds to a designed range of the lens module.

BRIEF DESCRIPTION OF THE DRAWINGS

The components of the drawing are not necessarily drawn to scale, the emphasis instead being placed upon clearly illustrating the principles of the embodiments of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
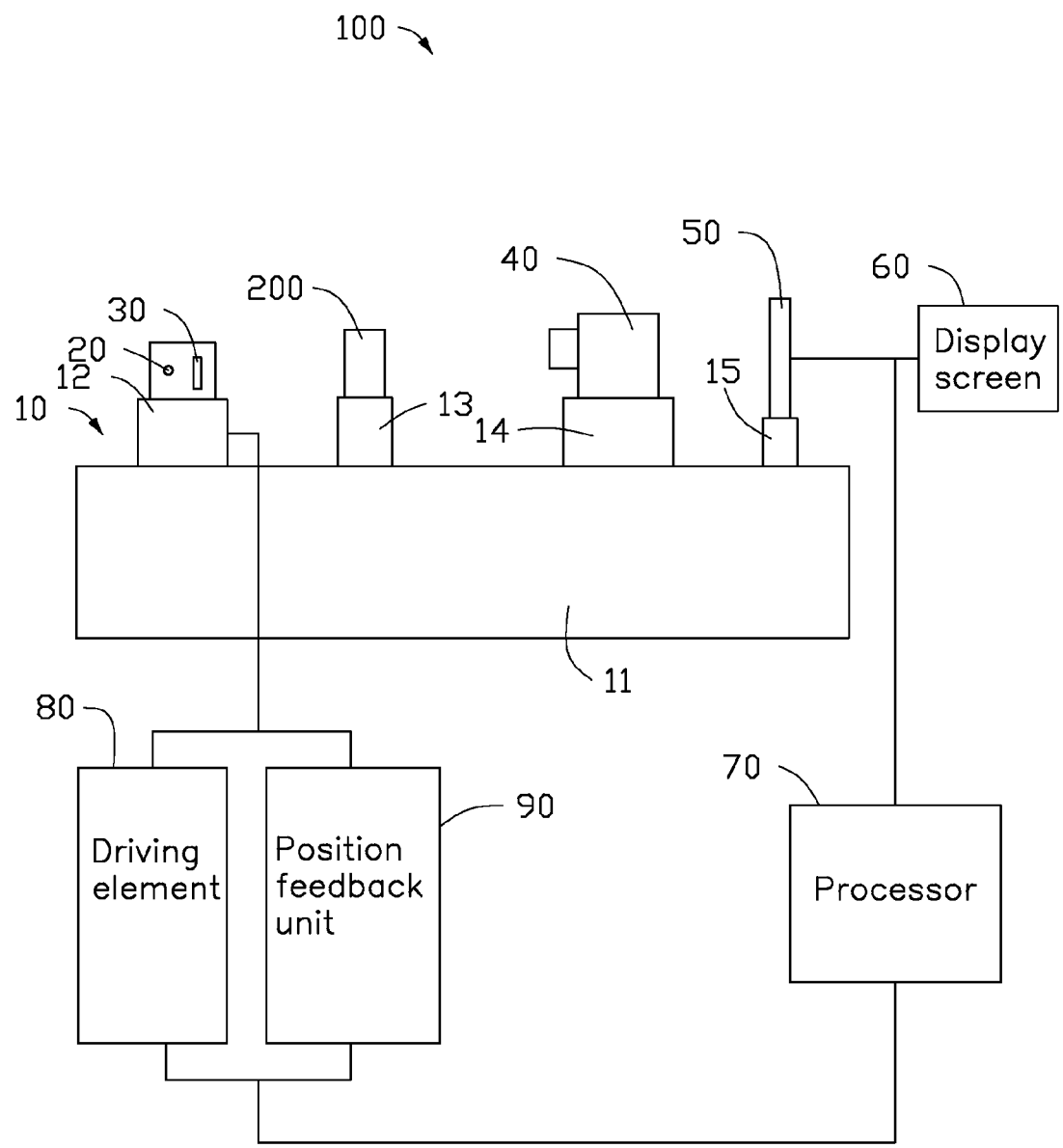
FIG. 1 is a diagrammatic view of an embodiment of a lens module testing device, the lens module testing device including a testing board.

FIG. 1 illustrates one embodiment of a lens module testing device 100. The lens module testing device 100 is configured for testing a focal length of a lens module 200. The lens module testing device 100 includes a testing platform 10, a light source 20, a testing board 30, a collimator 40, a sensing element 50, a display screen 60, a processor 70, a driving element 80, and a position feedback unit 90. The light source 20, the testing board 30, the collimator 40, and the sensing element 50 are arranged in order along an optical axis of the lens module 200. The lens module 200 is positioned between the testing board 30 and the sensing element 50.

The lens module 200, the light source 20, the testing board 30, the collimator 40, and the sensing element 50 are positioned on the testing platform 10. The testing platform 10 includes a base 11, an adjusting member 12, a first fixing member 13, a second fixing member 14, and a third fixing member 15. The adjusting member 12 is positioned on the base 11 and is slidable along the optical axis of the lens module 200. In one embodiment, the first fixing member 13, the second fixing member 14, and the third fixing member 15 are fixed on the base 11.

The light source 20 is fixed on the adjusting member 12. The light source 20 emits testing light to the testing board 30. The light source 20 can be a laser or a light-emitting diode (LED). In this embodiment, the light source 20 is an LED.

Figure 2:
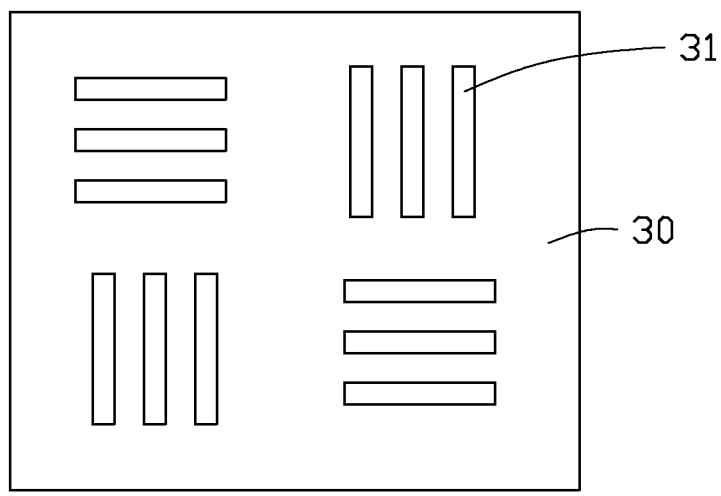
FIG. 2 is a planar view of the testing board of the lens module testing device of FIG. 1.

The testing board 30 is fixed on the adjusting member 12 and spaced a predetermined distance from the light source 20. Referring to FIG. 2, the testing board 30 defines a plurality of pattern portions 31 therein. In this embodiment, the testing board 30 is a metal board, and the pattern portions 31 are slots defined by an etching process.

The collimator 40 is fixed on the second fixing member 14. The collimator 40 converts incident light into collimated light and projects the collimated light onto the sensing element 50.

The sensing element 50 is fixed on the third fixing member 15. The sensing element 50 senses an image of the testing board 30. The sensing element 50 can be a charge-coupled device (CCD) or a complementary metal-oxide semiconductor (CMOS) device. In this embodiment, the sensing element 50 is a CCD.

The display screen 60 is electrically connected to the sensing element 50. The display screen 60 displays the image sensed by the sensing element 50.

The processor 70 is electrically connected to the sensing element 50. The processor 70 processes the image sensed by the sensing element 50, determines whether the testing board 30 is in a focal plane of the lens module 200, and controls the driving element 80 according to a determining result.

The driving element 80 is connected to the adjusting member 12 and the processor 70. The driving element 80 drives the adjusting member 12 to adjust a position of the testing board 30 relative to the lens module 200. In this embodiment, the driving element 80 is a linear motor.

The position feedback unit 90 is connected to the adjusting member 12 and the processor 70. The position feedback unit 90 detects a position of the testing board 30 relative to the lens module 200 and sends a detecting result to the processor 70. In this embodiment, the position feedback unit 90 is an infrared distance meter and is fixed on the adjusting member 12.

In a testing process of the lens module 200, the lens module 200 is fixed on the first fixing member 13, and the light source 20 is turned on to emit testing light. The testing light projects onto the testing board 30 and passes through the pattern portions 31 of the testing board 30. The lens module 200 captures light passing through the pattern portions 31. The collimator 40 converts the light into collimated light and projects the collimated light onto the sensing element 50. The sensing element 50 senses an image of the testing board 30. At the same time, the driving element 80 drives the adjusting member 12 to move along the optical axis of the lens module 200 to adjust a position of the testing board 30 relative to the lens module 200. The processor 70 determines whether the testing board 30 is in a focal plane of the lens module 200 according to the image of the testing board 30. In detail, the processor 70 determines whether the testing board 30 is in the focal plane of the lens module 200 according to a sharpness of the image of the testing board 30 sensed by the sensing element 50. When the image of the testing board 30 has a predetermined sharpness, the processor 70 determines that the testing board 30 is in the focal plane of the lens module 200. If the testing board 30 is in the focal plane of the lens module 200, the processor 70 sends a stop signal to the driving element 80, causing the driving element 80 to stop driving the adjusting member 12, and the position feedback unit 90 sends position information of the testing board 30 to the processor 70. The processor 70 determines a focal length of the lens module 200. The processor 70 can control the display screen to display a value of the focal length of the lens module 200. Further, the lens module testing device 100 stores a designed value of the lens module 200 in an electronic storage (not shown), and the processor 70 compares the tested value of the lens module 200 to the designed value and generates an offset between the tested value and the designed value of the lens module 200. The offset can be used as a reference in a correcting process of the lens module 200.

The lens module testing device 100 can automatically test a focal length of the lens module 200, thereby increasing testing efficiency. Furthermore, the testing device 100 has a simple structure and is convenient to test the lens module 200.

It is The present embodiments and their advantages are apparent from the foregoing description, and various changes may be made thereto without departing from the spirit and scope of the disclosure or sacrificing all of its material advantages, the examples hereinbefore described merely being exemplary embodiments of the disclosure.

What is claimed is:

1. A lens module testing device for testing a lens module, comprising:
   a testing platform;
   a light source positioned on the testing platform;
   a testing board positioned on the testing platform and being fixed relative to the light source, the testing board defining a pattern portion comprising a plurality of hollow patterns;
   a sensing element positioned on the testing platform;
   a processor electrically connected to the sensing element;
   a driving element electrically connected to the processor; and
   a position feedback unit electrically connected to the processor;
   wherein the light source, the testing board, the sensing element are arranged in order along an optical axis of the lens module, the lens module is positioned between the testing board and the sensing element, the light source is configured for emitting testing light to the testing board, the sensing element is configured for sensing an image of the testing board, and the processor is configured for determining whether the testing board is in a focal plane of the lens module, controlling the driving element to adjust position of the testing board relative to the lens module, and generating a focal length of the lens module from position information from the position feedback unit.

2. The lens module testing device of claim 1, further comprising a collimator positioned between the lens module and the sensing element, the collimator being configured for converting incident light into collimated light and projecting the collimated light on the sensing element.

3. The lens module testing device of claim 2, wherein the lens module comprises a display screen electrically connected to the sensing element and the processor for displaying the image of the testing board sensed by the sensing element and displaying a value of the focal length of the length of the lens module generated by the processor.

4. The lens module testing device of claim 3, wherein the testing platform comprises a base and an adjusting member slidably connected to the base, the light source and the testing board are fixed on the adjusting member, the driving member drives the adjusting member along the optical axis of the lens module to adjust the position of the testing board relative to the lens module.

5. The lens module testing device of claim 3, wherein the testing platform comprises a first fixing member, a second fixing member, and a third fixing member, and wherein the first fixing member, the second fixing member, and the third fixing member are fixed on the base, the lens module is fixed on the first fixing member, the collimator is fixed on the second fixing member, and the sensing element is fixed on the third fixing member.

6. The lens module testing device of claim 1, wherein the testing board is a metal board, and the patterns are formed by an etching process.

7. The lens module testing device of claim 1, wherein the driving element is a linear motor.

8. The lens module testing device of claim 1, wherein the position feedback unit is an infrared distance meter.

9. The lens module testing device of claim 1, wherein the lens module testing device stores a designed focal length of the lens module, the processor compares the focal length generated by the processor to the designed focal length of the lens module and generates an offset between the focal length generated by the processor and the designed focal length of the lens module.

* * * * *